(12) United States Patent
Barton (10) Patent No.: US 10,826,319 B2
(45) Date of Patent: *Nov. 3, 2020

(54) SELF-CHARGING POWER SOURCE

(71) Applicant: Tiarra Barton, Columbus, OH (US)

(72) Inventor: Tiarra Barton, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,957

(22) Filed: Apr. 13, 2020

(65) Prior Publication Data

US 2020/0244092 A1 Jul. 30, 2020

Related U.S. Application Data

(63) Continuation of application No. 16/164,255, filed on Oct. 18, 2018, now Pat. No. 10,622,822, which is a continuation-in-part of application No. 15/730,352, filed on Oct. 11, 2017.

(51) Int. Cl.
| | | |
|---|---|---|
| *H02J 7/34* | (2006.01) | |
| *H02J 7/00* | (2006.01) | |
| *G01H 1/00* | (2006.01) | |
| *H02N 99/00* | (2006.01) | |
| *G01H 3/00* | (2006.01) | |
| *H02J 7/35* | (2006.01) | |

(52) U.S. Cl.
CPC .............. *H02J 7/342* (2020.01); *G01H 1/00* (2013.01); *H02J 7/007* (2013.01); *H02N 99/00* (2013.01); *G01H 3/00* (2013.01); *H02J 7/0042* (2013.01); *H02J 7/0047* (2013.01); *H02J 7/345* (2013.01); *H02J 7/35* (2013.01); *H04M 2250/12* (2013.01)

(58) Field of Classification Search
CPC .. H02J 7/0054; H02J 7/0055; G01H 1/00–16; G01R 31/38
USPC ........................................................ 320/101
See application file for complete search history.

(56) References Cited

U.S. PATENT DOCUMENTS

| | | | |
|---|---|---|---|
| 9,103,920 B2* | 8/2015 | Valentino | .............. G01J 1/0488 |
| 2009/0223071 A1 | 9/2009 | Alberti et al. | |
| 2013/0328416 A1* | 12/2013 | Whitworth | ................ F03G 5/06 307/149 |
| 2019/0109476 A1 | 4/2019 | Barton | |

* cited by examiner

*Primary Examiner* — David V Henze-Gongola
(74) *Attorney, Agent, or Firm* — Walter Haverfield LLP; James J. Pingor (57) ABSTRACT

The innovation disclosed and claimed herein, in at least one aspect thereof, comprises continuously charging a cell phone while the user utilizes the cellular phone for ordinary activities (e.g. posting to social media sites, texting, talking, etc.). The signals from routine cellular phone operations will send signals to a photocoupler or other dedicated sensor. The dedicated sensor will output current to drive a magnet mechanism which will in turn drive a fan that generates current to charge to a super/ultra-capacitor.

20 Claims, 6 Drawing Sheets

SELF-CHARGING POWER SOURCE

CROSS REFERENCE

This application is a continuation of and claims priority to U.S. patent application Ser. No. 16/164,255, filed Oct. 18, 2018, and entitled "SELF-CHARGING POWER SOURCE", which is a continuation-in-part of, and claims priority to U.S. patent application Ser. No. 15/730,352, filed Oct. 11, 2017, and entitled "SELF-CHARGING CELLULAR PHONE POWER SOURCE". These applications are expressly incorporated herein by reference.

BACKGROUND

As the capabilities of cellular phones increase their usage rates likewise increase. The increased usage rates drive a need for increased power. Such a demand may be met by increasing battery capacity. However, larger capacity batteries still require ready access to an electrical wall outlet or other power source. This need can also be addressed by carrying additional batteries, but this practice can become cumbersome to consumers due to increased bulk and weight. Additionally, existing solutions may not offer power for a sufficiently long time period or under inhospitable conditions. There is a need for a means of extending battery life that will far exceed the daily needs of the average user, even in austere conditions.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of providing internally-generated power for extended cellular phone use, virtually eliminating or otherwise alleviating a need to recharge a cellular phone using external means such as a wall outlet.

In aspects, the subject innovation provides substantial benefits in terms of convenience. One advantage resides in the fact that the new technology will cost less than existing alternatives. Additionally the present innovation is light weight, uses less energy than alternative solutions, and can hold a charge without use of the phone, e.g., for three days.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 1:
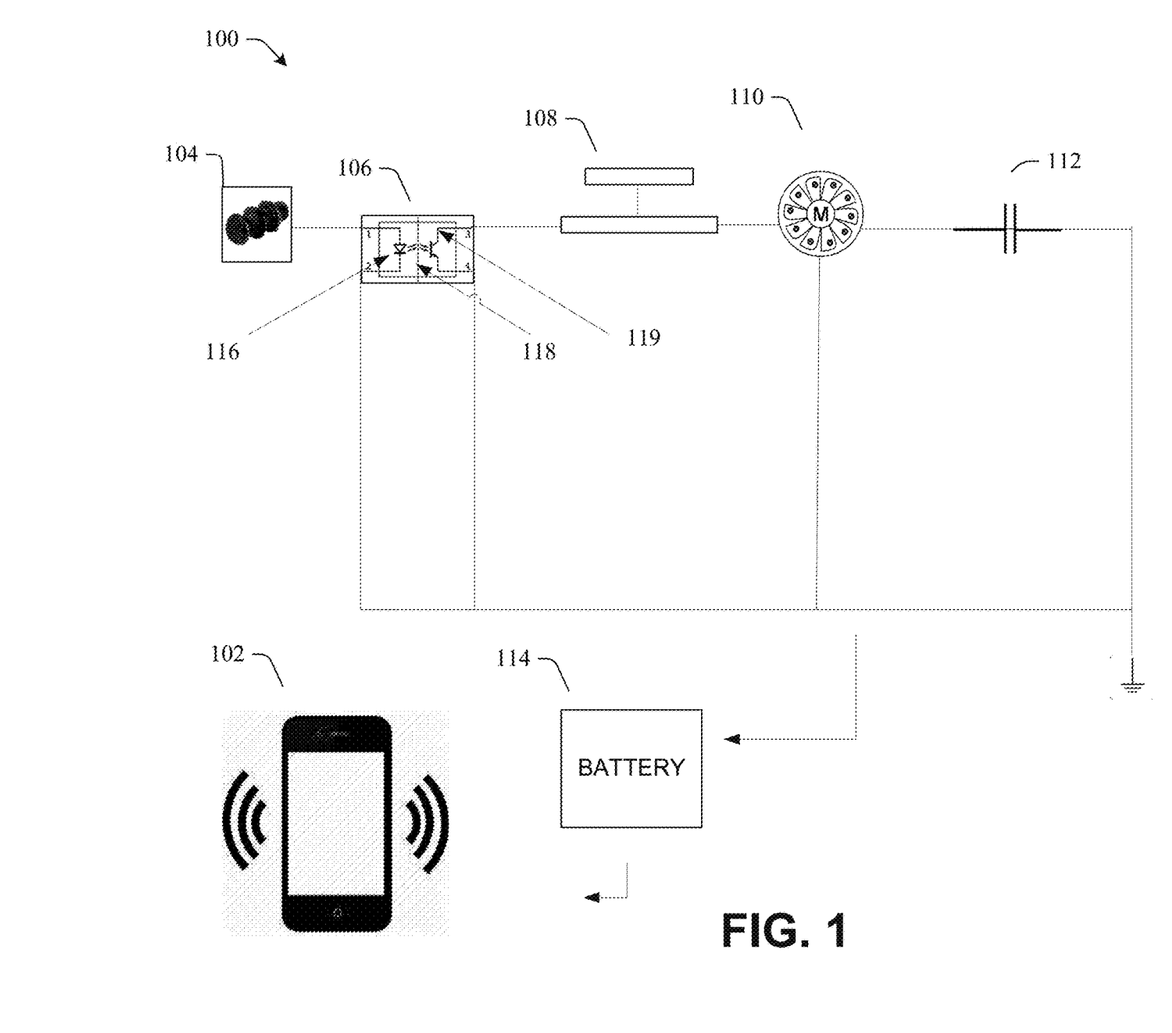
FIG. 1 illustrates an example component diagram of a system for continually charging a cellular phone according to an embodiment of the present innovation.

FIG. 1 illustrates an example component diagram of a system for continually charging a mobile, smart- and/or cellular phone according to an embodiment of the present innovation. For example, a system (100) operative to continuously charge a cellular phone (102) may include, at least one acoustic sensor/dedicated sensor (104), a photocoupler/opto-isolator/opto-coupler (106), a motor comprising a spinning magnet mechanism (108) and a rotating fan (110), and a super capacitor (112). The acoustic sensor (104) (e.g. a microphone) detects vibrations that result from the activities of a cellular phone user (e.g. speech, typing, external audio). The photocoupler (106) converts electrical input signals received from the acoustic sensor (104) into light then outputs electric current. A super capacitor (112) receives and stores current from the motor and discharges the current into a rechargeable battery (114) that powers the cellular phone (102).

The acoustic sensor (104) is sufficiently sensitive to capture ambient noise, the voice of the cellular phone user, or the tapping of the buttons on the cellular phone (102).

The photocoupler (106) includes a near infrared light-emitting diode (LED) (116) operative to convert electrical input signals received from the acoustic sensor (104) into light, a closed optical channel dialectical channel (118), and a photosenor (119), which detects incoming light and generates electric energy. The photocoupler may be one of the following types: LED photodiode, LED-LASCR (light activated silicon controlled rectifier), or lamp-photoresistor.

The rotating fan assembly (110) comprises a fan with magnets affixed to the ends of its blades. The spinning magnet mechanism (108) rotates in response to the current it receives from the photocoupler (106), and the magnetic field generated by spinning magnet mechanism (108) repels the magnets of the rotating fan assembly (110), generating current to charge the super capacitor (112).

The super capacitor (112) is a double-layer capacitor, pseudocapacitor, or hybrid capacitor which powers the cellular phone (102) when it self-discharges. The super capacitor (112) has an extended self-discharge time, e.g., up to three days.

The system (100) may include at least one processor operative to control the operation of the acoustic sensor (104), photocoupler (106), spinning magnet mechanism (108), rotating fan assembly (110) and the battery (114).

In at least one other embodiment, the dedicated sensor (104) is an accelerometer or gyroscope operative to detect movement of the cellular phone (102).

In at least one other embodiment, the dedicated sensor (104) is proximity sensor operative to detect the presence of the cellular phone user within a specified distance.

Other embodiments may necessitate emergency charging of the super capacitor (112) when it has been severely depleted due to extended lack of phone use. In such instances, at least an initial amount of electrical power may be generated through means other than those listed above in order to resume operation of the cellular phone (102). Such recharging may be accomplished by means of, among other things, solar cells, a handpress dynamo, a handcrank, traditional outlet charging, kinetic means or the like.

Figure 2:
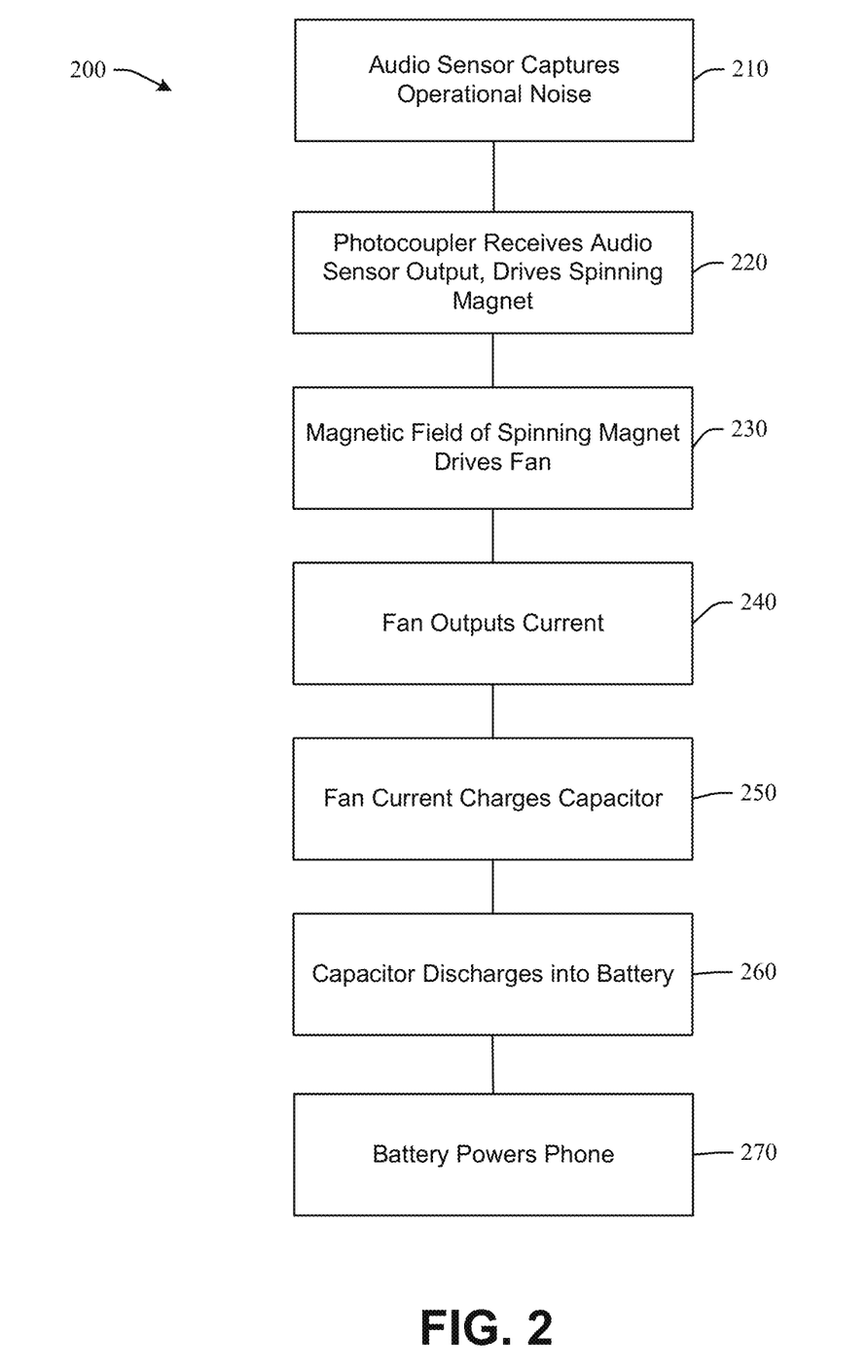
FIG. 2 illustrates an example flow diagram of a system according to FIG. 1.

FIG. 2 illustrates an example method (200) providing self-powered functionality in cellular phones in a number of steps. Step 201 shows detecting, via at least one dedicated sensor (e.g. an audio sensor) (104), the activities of a cellular phone user. Step 220-240 indicate receiving the electrical output of the dedicated sensor (104) at a photocoupler (106), driving a motor (108 and 110) by means of the electrical output of the photocoupler (106), and producing electrical current for storage. Step 240 indicates storing charge output by the motor (108 and 110) in a super capacitor (112). Step 260 indicates discharging the super capacitor (112) into a built-in battery (114) that powers the cellular phone (102). Step 270 indicates utilizing the energy discharged by the capacitor (112) to power the cellular phone (102).

It is to be understood and appreciated that the details regarding the features or characteristics associated with the system elements of FIG. 1 are equally applicable to the steps of FIG. 2 as appropriate.

Figure 3:
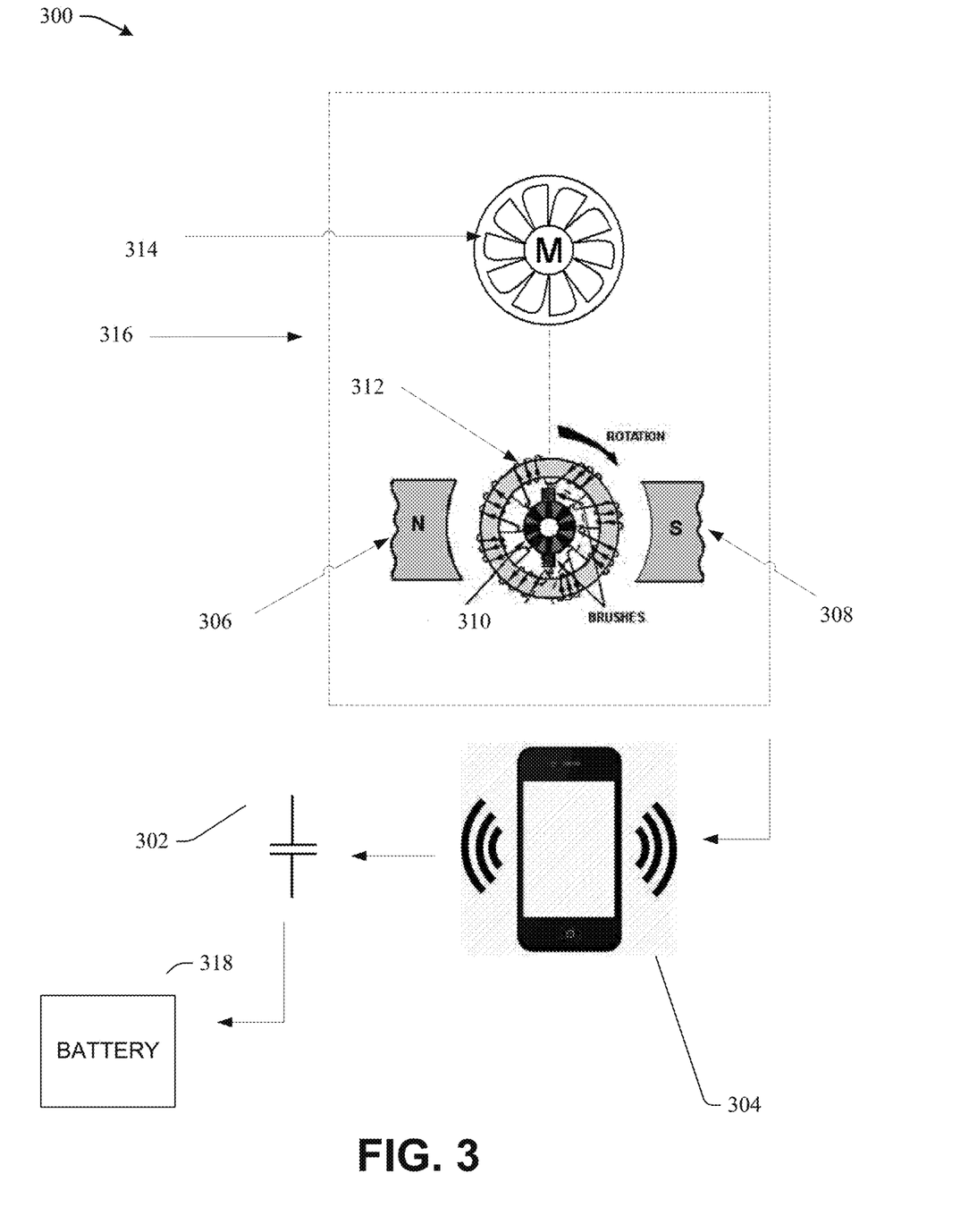
FIG. 3 illustrates an example motor for continually charging a cellular phone according to another embodiment of the present innovation.

FIG. 3 illustrates an example motor (300) that provides continuous power to a super capacitor (302) within a cellular phone housing (304) for continually charging a cellular phone (304). The motor includes a magnetic N-pole (306) and S-pole (308) configured to create a magnetic field therebetween. The motor further includes a rotating member (310) secured between the two poles (306, 308), the rotating member supporting at least one coil of conductive wire (312). The motor also includes a fan (314) configured to drive the rotating member (310) such that the rotating member (310) undergoes relative motion which passes the wire coil (312) through an air gap between the poles (306, 308) to intersect magnetic flux therein and generate electrical voltage and current. The motor (300) is surrounded by a Faraday cage (316) which shields the motor (300) from radio frequency interference and contains the magnetic field created by the motor (300) in order to shield other components of the cellular phone (304) from interference caused by the magnetic field.

In at least one embodiment, the motor (300) is operative to supply current to a downstream super capacitor (302) which self-discharges to charge a built-in battery (318) of the cellular phone (304).

In at least one embodiment, the motor (300) is operative to receive current from an upstream device to drive the fan (314).

In at least one embodiment, operation of the motor (300) is controlled by a processor located in the cellular phone housing (304).

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 4:
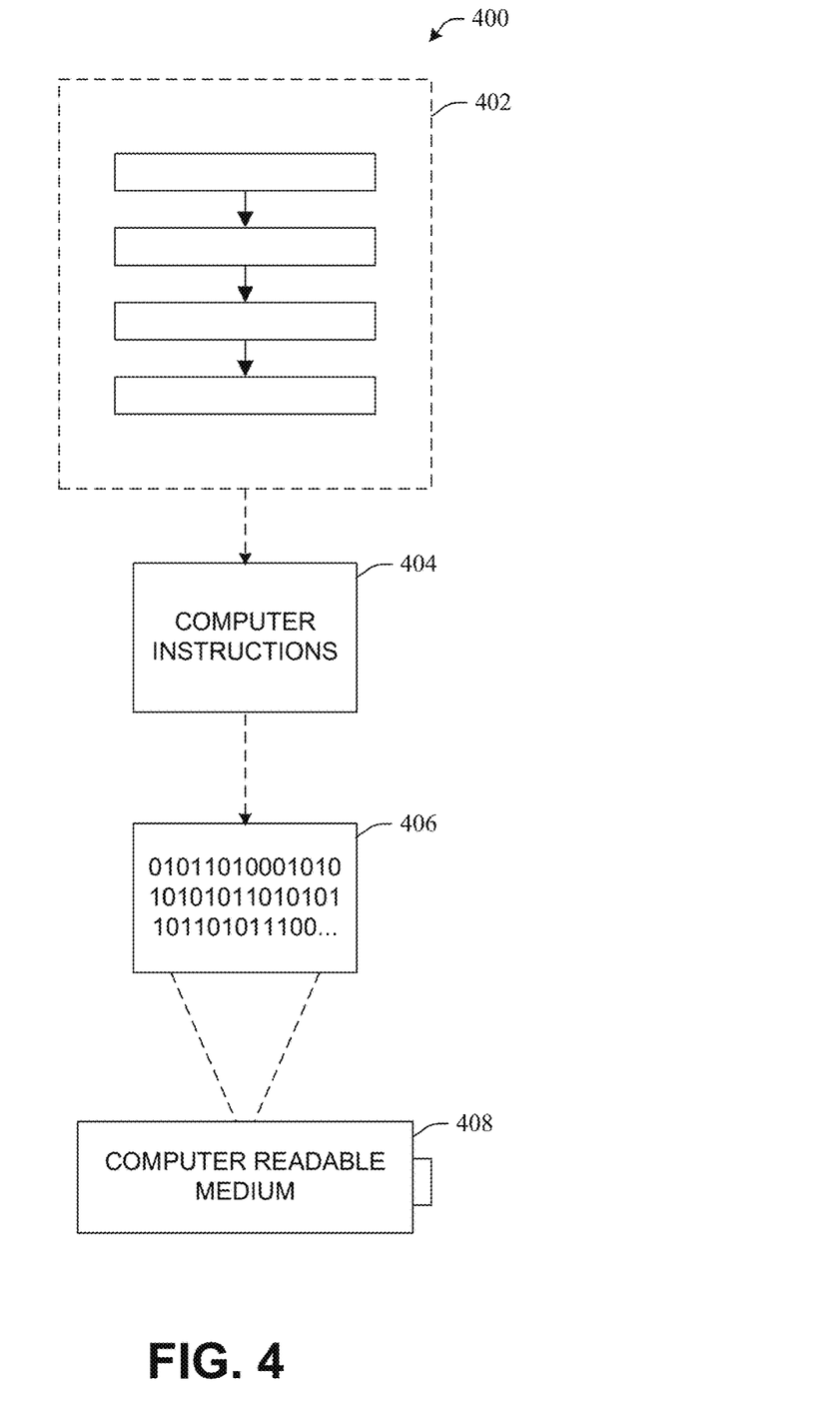
FIG. 4 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 4, wherein an implementation 400 comprises a computer-readable medium 408, such as a CD-R, DVD-R, flash drive, a platter of a hard disk drive, etc., on which is encoded computer-readable data 406. This computer-readable data 406, such as binary data comprising a plurality of zero's and one's as shown in 406, in turn comprises a set of computer instructions 404 configured to operate according to one or more of the principles set forth herein. In one such embodiment 400, the processor-executable computer instructions 404 is configured to perform a method 402, such as at least a portion of one or more of the methods described in connection with embodiments disclosed herein. In another embodiment, the processor-executable instructions 404 are configured to implement a system, such as at least a portion of one or more of the systems described in connection with embodiments disclosed herein. Many such computer-readable media can be devised by those of ordinary skill in the art that are configured to operate in accordance with the techniques presented herein.

While the aspects and embodiments are specifically directed to smart- and cell phones, it is to be understood that the features, functions and benefits herein can be applied to most any electronic device without departing from the spirit and/or scope of the innovation as described and claimed herein. For example, the innovation can be equally applied top tablets, laptops, smart-watches, or the like. These alternative embodiments are to be included within the scope of this disclosure and claims appended hereto.

Figure 5:
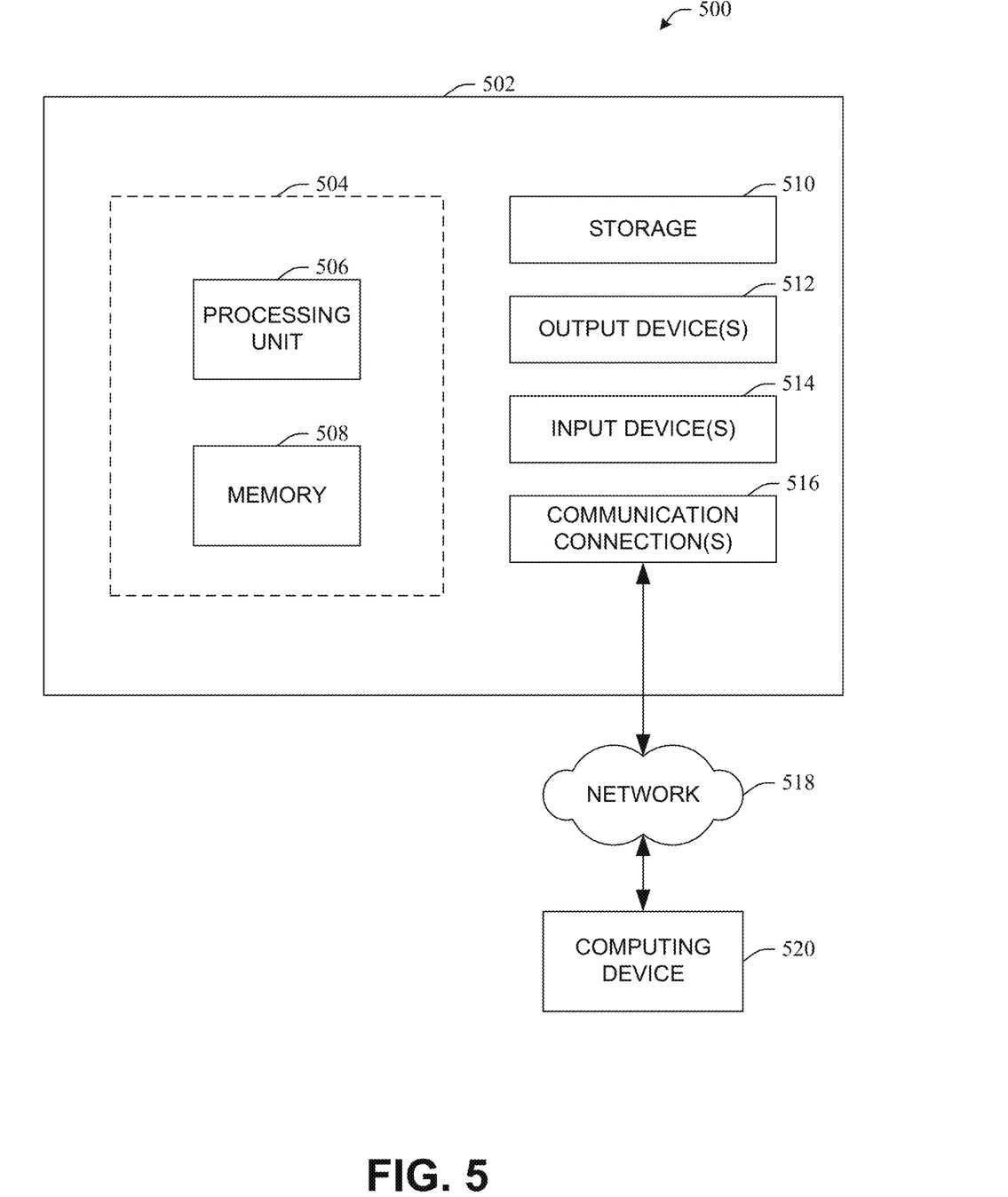
FIG. 5 illustrates a computing environment where one or more of the provisions set forth herein can be implemented, according to some embodiments.

With reference to FIG. 5 and the following discussion provide a description of a suitable computing environment in which embodiments of one or more of the provisions set forth herein can be implemented. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 5 illustrates a system 500 comprising a computing device 502 configured to implement one or more embodiments provided herein. In one configuration, computing device 502 can include at least one processing unit 506 and memory 508. Depending on the exact configuration and type of computing device, memory 508 may be volatile, such as RAM, non-volatile, such as ROM, flash memory, etc., or some combination of the two. This configuration is illustrated in FIG. 5 by dashed line 504.

In these or other embodiments, device 502 can include additional features or functionality. For example, device 502 can also include additional storage such as removable storage or non-removable storage, including, but not limited to, magnetic storage, optical storage, and the like. Such additional storage is illustrated in FIG. 5 by storage 510. In some embodiments, computer readable instructions to implement one or more embodiments provided herein are in storage 510. Storage 510 can also store other computer readable instructions to implement an operating system, an application program, and the like. Computer readable instructions can be accessed in memory 508 for execution by processing unit 506, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 508 and storage 510 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 502. Any such computer storage media can be part of device 502.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 502 can include one or more input devices 514 such as keyboard, mouse, pen, voice input device, touch input device, infrared cameras, video input devices, or any other input device. One or more output devices 512 such as one or more displays, speakers, printers, or any other output device can also be included in device 502. The one or more input devices 514 and/or one or more output devices 512 can be connected to device 502 via a wired connection, wireless connection, or any combination thereof. In some embodiments, one or more input devices or output devices from another computing device can be used as input device(s) 514 or output device(s) 512 for computing device 502. Device 502 can also include one or more communication connections 516 that can facilitate communications with one or more other devices 520 by means of a communications network 518, which can be wired, wireless, or any combination thereof, and can include ad hoc networks, intranets, the Internet, or substantially any other communications network that can allow device 502 to communicate with at least one other computing device 520.

Figure 6:
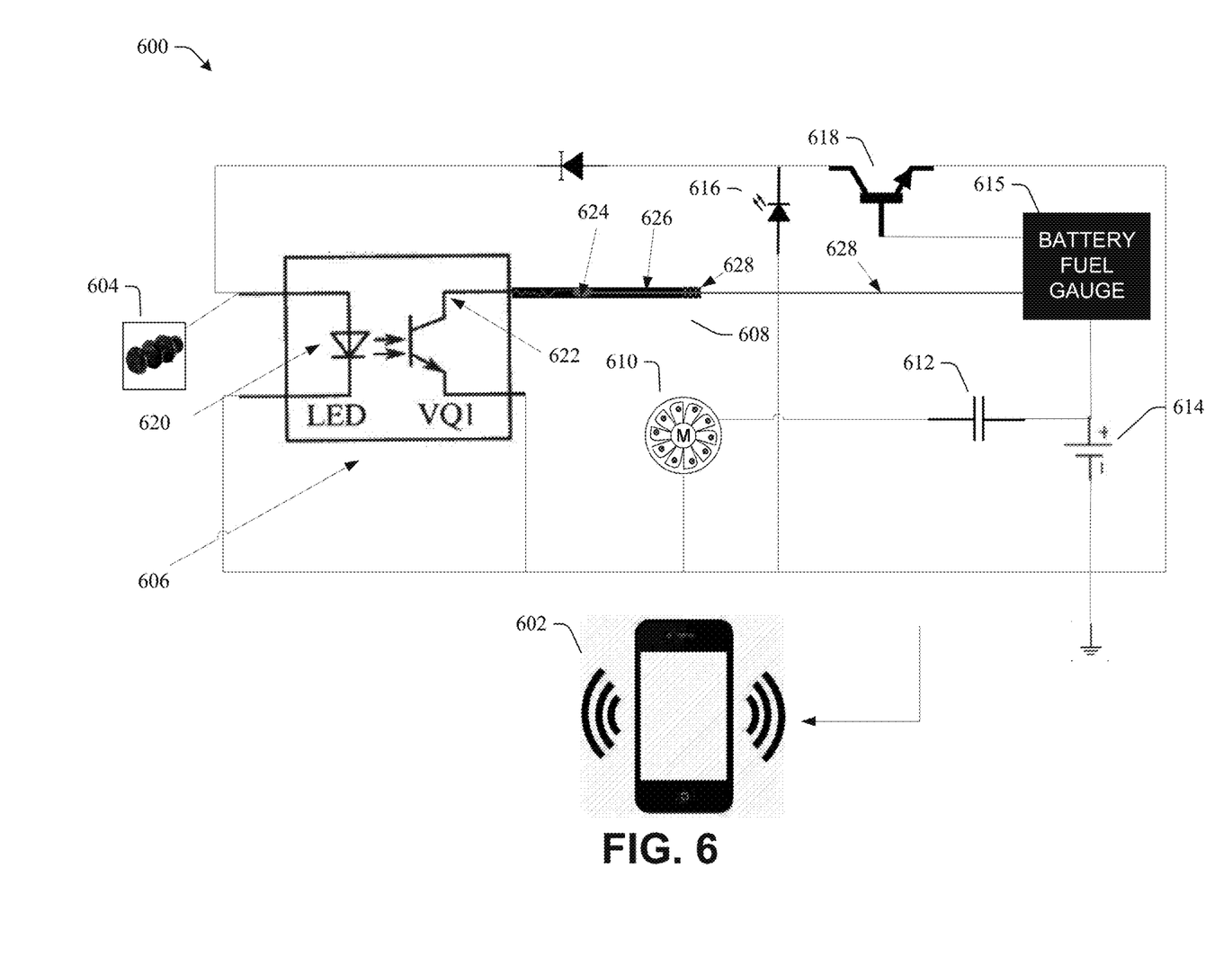
FIG. 6 illustrates component diagram of an alternative system for continually charging a cellular phone according to an embodiment of the present invention

FIG. 6 illustrates an alternative example component diagram of a system for continually charging a mobile, smart- and/or cellular phone according to an embodiment of the present innovation. For example, a system (600) operative to continuously charge a cellular phone 602) may include, at least one acoustic sensor/dedicated sensor (604), a photocoupler/opto-isolator/opto-coupler (606), a motor comprising a sliding magnet assembly (608) and a rotating fan (610), a super capacitor (612), a rechargeable battery (614), a battery monitoring assembly comprising a battery fuel gauge (615) a low battery LED (616) and a transistor (618). The acoustic sensor (604) (e.g. a microphone) detects vibrations that result from the activities of a cellular phone user (e.g. speech, typing, external audio). The photocoupler (606) converts electrical input signals received from the acoustic sensor (604) into light then outputs electric current. A super capacitor (612) receives and stores current from the motor and discharges the current into a rechargeable battery (614) that powers the cellular phone (602).

The acoustic sensor (604) is sufficiently sensitive to capture ambient noise, the voice of the cellular phone user, or the tapping of the buttons on the cellular phone (602).

The photocoupler (606) includes a near infrared light-emitting diode (LED) (616) operative to convert electrical input signals received from the acoustic sensor (620) into light, and a photosenor (622), which detects incoming light and generates electric energy. The photocoupler may be one of the following types: LED photodiode, LED-LASCR (light activated silicon controlled rectifier), or lamp-photoresistor.

The sliding magnet assembly (608) includes a magnet (624) a magnet guideway (626) with an optional magnet stopper (628) at one end and memory shape alloy wire (628) which extends from the photocoupler (606) to the battery fuel gauge (615). This wire is activated when current or heat flows through or around it. Current is supplied to the wire by the photocoupler (606). Within the magnet guideway (626) there are two segments of wire, one before the magnet (624) and one after the magnet (624). Once the current flows through the wire, the respective segments of wire extend or retract back to their previous shapes. Once current or heat is no longer being applied, again, the respective segments of wire extend or retract back to their previous shapes. The segment of wire extending from the stopper (628) to the battery fuel gauge (615) does not expand or contract as it is held taught.

The rotating fan assembly (610) comprises a fan with magnets affixed to the ends of its blades. The magnet (624) in the magnetic guideway (626) and the magnets affixed to the blades of rotating fan assembly (610) are of opposite polarities. Thus, as it travels back and forth, the magnet (624) in the magnetic guideway (626) repels the magnets of the rotating fan assembly (610), causing the fan to rotate, generating current to charge the super capacitor (612)

The battery (614) and battery fuel gauge (615) are only part of this circuit once it is integrated with the mobile phone circuit. The transistor (618) is connected to the low battery LED (616) and a sensor (not shown) on the battery fuel gauge (615). Once the battery fuel gauge (615) detects a lack of charge in the battery (614) the battery fuel gauge (615) sends a "Low Battery" signal to the transistor (618). The transistor (618) then switches on, lighting the LED (616), which will start the process over again to begin charging the phone.

The super capacitor (612) is a double-layer capacitor, pseudocapacitor, or hybrid capacitor which powers the cellular phone (602) when it self-discharges. The super capacitor (612) has an extended self-discharge time, e.g., up to three days.

The system (600) may include at least one processor operative to control the operation of the acoustic sensor (604), photocoupler (606), spinning magnet mechanism (608), rotating fan assembly (610) and the battery (614).

In at least one other embodiment, the dedicated sensor (604) is an accelerometer or gyroscope operative to detect movement of the cellular phone (602).

In at least one other embodiment, the dedicated sensor (604) is proximity sensor operative to detect the presence of the cellular phone user within a specified distance.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for charging a power source, the system comprising:
   at least one sensor in an electronic device that detects vibrations, wherein the vibrations represent electrical input signals;
   a photocoupler:
      a light emitting diode (LED) configured to convert the electrical input signals received from the sensor into light, and
      a photosensor that detects incoming light and generates electric energy based upon the incoming light;
   a motor comprising a rotatable portion, wherein the rotatable portion rotates when electric energy is received from the photocoupler, wherein rotation of the rotatable portion generates current:
   a super capacitor, that receives the current and stores energy from the motor, wherein the super capacitor charges a rechargeable power source of the electronic device.

2. The system of claim 1 wherein the electronic device is selected from a phone, a tablet, a laptop computer, a smartwatch, or a wearable.

3. The system of claim 2, wherein the phone is a mobile phone, a smart phone, or a cellular phone.

4. The system of claim 1 wherein the sensor detects vibrations resulting from the voice of a user, physical manipulation of the device, or external sources.

5. The system of claim 1, wherein the sensor is an acoustic sensor.

6. The system of claim 1, wherein the photocoupler is of one of the following types:
   LED photodiode, LED-LASCR (light activated silicon controlled rectifier), or lamp-photoresistor.

7. The system of claim 1 wherein the rotatable portion comprises:
   a rotating fan assembly comprising:
      a fan having a rotatable blade; and
      a magnet affixed to an end of the rotatable blade; and
   a sliding magnet assembly comprising;
      a magnet configured to slide along a magnet guideway when current is supplied to the motor from the photocoupler,
   wherein the magnet in the sliding magnet assembly has opposite polarity of the magnet of the rotating fan assembly and therefore repels the magnet of the rotating fan assembly as it slides back and forth along the magnetic guideway causing the fan to rotate, generating current to charge the super capacitor.

8. The system of claim 7, wherein the sliding magnet assembly includes a shape memory alloy wire that extends from the photocoupler to a power source fuel gauge.

9. The system of claim 1 further comprising:
   a power source fuel gauge having a sensor, and
   a transistor operatively connected to the photocoupler and the power source fuel gauge sensor;
   wherein after detecting a lack of charge at the power source, the power source fuel gauge sensor sends a signal to the transistor,
   wherein upon receiving the signal at the transistor, the process of charging the rechargeable power source begins.

10. The system of claim 1, wherein the system further comprises a solar panel that charges the super capacitor.

11. The system of claim 1, wherein the motor is surrounded by a Faraday cage that shields the motor from radio frequency interference and shields other components of the electronic device from interference caused by a magnetic field generated by the motor.

12. The system of claim 1, wherein a processor located within the electronic device controls the operation of the motor.

13. The system of claim 12, wherein the processor further controls operation of the sensor, the photocoupler, and the rechargeable power source.

14. A method of charging a power source of an electronic device, the method comprising:
- detecting, via at least one sensor, vibrations that result from the activities of a user the electronic device;
- receiving an electrical output of the sensor at a photocoupler, wherein the electrical output represents a conversion of the detected vibrations;
- generating and outputting electrical energy as a result of receiving the electrical output at the photocoupler;
- receiving the outputted electrical energy at a motor comprising rotatable components,
- rotating the rotatable components via the electrical energy, wherein the electrical energy causes the rotatable components to rotate and generate current;
- storing energy generated by the motor in a super capacitor; and
- discharging current generated by the super capacitor into a rechargeable power source of the electronic device.

15. The method of claim 14, further comprising:
- receiving, at a power source health gauge sensor, a signal indicating that the power source charge has been depleted beyond a preset threshold;
- transmitting the signal to a transistor operatively connected to the power source health gauge sensor upon receipt of the signal,
- sending current from the transistor to a low power source light emitting diode (LED) and passing current through to the photocoupler to begin the charging process.

16. The method of claim 15, wherein the transistor is switched on once the power source health gauge sensor transmits the signal.

17. The method of claim 14, wherein rotating the rotatable components comprises:
- driving a sliding magnet assembly of the motor back and forth along a magnet guideway via the electrical energy output from the photocoupler, wherein the driving of the sliding magnet assembly along the magnet guideway causes a magnet attached to a blade of a rotating fan assembly to be repelled, thus causing the blade of the rotating fan assembly to rotate.

18. The method of claim 14, wherein the super capacitor discharges into the rechargeable power source at a predetermined rate.

19. The method of claim 14, wherein the dedicated sensor is an acoustic sensor that captures ambient noise, the voice of a user, or tapping on the electronic device.

20. The method of claim 14, wherein the dedicated sensor is an accelerometer or gyroscope that detects movement of the electronic device.

* * * * *